US011250461B2

United States Patent
Song (10) Patent No.: US 11,250,461 B2
(45) Date of Patent: Feb. 15, 2022

(54) DEEP LEARNING SYSTEMS AND METHODS IN ARTIFICIAL INTELLIGENCE

(71) Applicant: MASTERCARD INTERNATIONAL INCORPORATED, Purchase, NY (US)

(72) Inventor: Suqiang Song, Hayward, CA (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 16/582,376

(22) Filed: Sep. 25, 2019

(65) Prior Publication Data

US 2020/0279288 A1    Sep. 3, 2020

Related U.S. Application Data

(60) Provisional application No. 62/812,643, filed on Mar. 1, 2019.

(51) Int. Cl.
*G06Q 30/02* (2012.01)
*G06F 17/16* (2006.01)
(Continued)

(52) U.S. Cl.
CPC ......... *G06Q 30/0239* (2013.01); *G06F 17/16* (2013.01); *G06N 3/0481* (2013.01); *G06N 20/00* (2019.01); *G06Q 30/0222* (2013.01)

(58) Field of Classification Search
CPC ............ G06Q 30/0239; G06Q 30/0222; G06F 17/16; G06N 20/00; G06N 3/0481
(Continued)

(56) References Cited

U.S. PATENT DOCUMENTS 10,331,983 B1   6/2019   Yang
10,332,261 B1   6/2019   Farivar
(Continued)

FOREIGN PATENT DOCUMENTS

WO    WO-2008073366 A2 *   6/2008    ......... G06K 9/00228

OTHER PUBLICATIONS

Julien Boudet, The heartbeat of modern marketing: Data activation and personalization, 2017 (Year: 2017).*
(Continued)

*Primary Examiner* — Tarek Elchanti
(74) *Attorney, Agent, or Firm* — Armstrong Teasdale LLP (57) ABSTRACT

A system for training and applying deep learning to generate offer recommendations within a payment card network includes a propensity engine configured to train a machine learning model using neural collaborative filtering. The model is trained based on payment card transaction data providing indications of cardholder interactions with merchants, the model is configured to generate offer recommendations for cardholders of payment cards made available by merchants. The system also includes a model serving engine configured to apply available offer data to the model, thereby generating a set of offer recommendations matching one or more available offers with one or more cardholders. The system also includes an execution and fulfilment engine configured to deliver an available offer to a cardholder and fulfill the available offer when activated by the cardholder.

18 Claims, 8 Drawing Sheets

(51) Int. Cl.
 *G06N 20/00* (2019.01)
 *G06N 3/04* (2006.01)
(58) Field of Classification Search
 USPC .............................. 705/14.39, 14.27, 38, 30
 See application file for complete search history.

(56) References Cited

U.S. PATENT DOCUMENTS

| | | | | |
|---|---|---|---|---|
| 10,349,126 | B2 | 7/2019 | Yun | |
| 2008/0262925 | A1* | 10/2008 | Kim | G06N 20/00 705/14.27 |
| 2010/0049588 | A1* | 2/2010 | Debow | G06Q 40/02 705/38 |
| 2011/0099059 | A1* | 4/2011 | Agarwal | G06Q 30/0256 705/14.43 |
| 2016/0189312 | A1* | 6/2016 | Lee | G06F 16/9038 705/30 |
| 2017/0249557 | A1* | 8/2017 | Tendick | G06N 5/043 |
| 2018/0276710 | A1 | 9/2018 | Tietzen et al. | |
| 2019/0066130 | A1 | 2/2019 | Shen et al. | |
| 2019/0130448 | A1 | 5/2019 | Kairinos | |
| 2019/0164202 | A1 | 5/2019 | Ukhalkar et al. | |

OTHER PUBLICATIONS

Julien Boudet, Technology has finally advanced to the point where marketers can use real-time data in a way that is both meaningful to customers and profitable for companies, 2017 (Year: 2017).*
Sophia Turol, Building Recommenders with Multilayer Perceptron Using TensorFlow, 2018 (Year: 2018).*
Xiangnan He et al., "Neural Collaborative Filtering", International World Wide Web Conference Committee, Aug. 26, 2017, 10 pages.

* cited by examiner

DEEP LEARNING SYSTEMS AND METHODS IN ARTIFICIAL INTELLIGENCE

CROSS-REFERENCE TO RELATED APPLICATIONS

This application claims the benefit of priority to U.S. Provisional Patent Application No. 62/812,643, filed 1 Mar. 2019, entitled DEEP LEARNING SYSTEMS AND METHODS IN ARTIFICIAL INTELLIGENCE, the entire contents and disclosure of which are hereby incorporated by reference in their entireties.

FIELD OF THE DISCLOSURE

The field of the disclosure relates generally to artificial intelligence and, more specifically, to systems and methods for deep learning with neural collaborative filtering and wide and deep learning.

BACKGROUND

The field of artificial intelligence (AI) includes systems and methods that allow a computer to interpret external data, "learn" from that data, and apply that knowledge to a particular end. AI has been applied to numerous technical problems in computer science, including applications such as optical character recognition, human speech recognition, gaming systems, autonomous vehicle operation, recommender systems, and simulation systems, to name but a few. The problem of programming a computer to make "intelligent" decisions is daunting, whether when dealing with the problems of perception, knowledge representation, reasoning, learning, planning, or other such problems.

One tool of AI, inspired by biological neural networks, is artificial neural networks. An artificial neural network (or just "neural network," for simplicity) is a computer representation of a network of nodes (or artificial neurons) and connections between those nodes that, once the neural network is "trained," can be used for predictive modeling. Neural networks typically have an input layer of nodes representing some set of inputs, one or more interior ("hidden") layers of nodes, and an output layer representing one or more outputs of the network. Each node in the interior layers is typically fully connected to the nodes in the layer before and the layer after by edges, with the input layer of nodes being connected only to the first interior layer, and with the output layer of nodes being connected only to the last interior layer. The nodes of a neural network represent artificial neurons and the edges represent a connection between two neurons.

Further, each node may store a value representative of some embodiment of information, and each edge may have an associated weight generally representing a strength of connection between the two nodes. Neural networks are typically trained with a body of labeled training data, where each set of inputs in the training data set is associated with known output value (the label for those inputs). For example, during training, a set of inputs (e.g., several input values, as defined by the number of nodes in the input layer) may be applied to the neural network to generate an output (e.g., several output values, as defined by the number of nodes in the output layer). This output is unlikely to match the given label for that set of inputs since the neural network is not yet configured. As such, the output is then compared to the label to determine differences between each of the output values and each of the label values. These differences are then back-propagated through the network, changing the weights of the edges and the values of the hidden nodes to such that the network will better conform to the known training data. This process may be repeated many thousands of time or more, based on the body of training data, configuring the network to better predict particular outputs given particular inputs. As such, the neural network becomes a "mesh" of information embodied by the nodes and the edges, an information network that, when given an input, generates a predictive output.

Such neural networks have been successfully applied in the tasks of speech recognition, computer vision, and natural language processing, to name but a few. However, traditional neural network systems and methods typically require preparation and staging steps that can be computationally prohibitive in various use cases. For example, in some situations, feature engineering computations may be regularly needed to generate or regenerate the inputs used to train the neural network. These staging steps can represent a disproportionate computational burden when, for example, the input data is regularly updated with recent data (e.g., daily, weekly).

Accordingly, a deep learning system is needed that reduces computational burdens experienced by traditional neural network systems.

BRIEF DESCRIPTION

In one aspect, a system for training and applying deep learning to generate offer recommendations within a payment card network is provided. The system includes a propensity engine configured to train a machine learning model using neural collaborative filtering. The machine learning model is trained based on payment card transaction data providing indications of cardholder interactions with merchants. The machine learning model is configured to generate offer recommendations for cardholders of payment cards. The offer recommendations are for merchant offers made available by merchants. The system also includes a model serving engine configured to apply available offer data to the machine learning model, thereby generating a set of offer recommendations matching one or more available offers with one or more cardholders. The system further includes an execution and fulfilment engine configured to deliver an available offer to a cardholder and fulfill the available offer when activated by the cardholder.

In another aspect, a computer-implemented method for training and applying deep learning to generate offer recommendations within a payment card network is provided. The method is implemented using a processor in communication with a memory. The method includes training a machine learning model using neural collaborative filtering. The machine learning model is trained based on payment card transaction data providing indications of cardholder interactions with merchants. The machine learning model is configured to generate offer recommendations for cardholders of payment cards. The offer recommendations are for merchant offers made available by merchants. The method also includes applying available offer data to the machine learning model, thereby generating a set of offer recommendations matching one or more available offers with one or more cardholders. The method further includes delivering an available offer to a cardholder. The method also includes fulfilling the available offer upon cardholder activation.

In yet another aspect, a non-transitory computer readable medium that includes computer executable instructions is provided. When executed by a computing device comprising at least one processor in communication with at least one memory device, the computer executable instructions cause the computing device to train a machine learning model using neural collaborative filtering. The machine learning model is trained based on payment card transaction data providing indications of cardholder interactions with merchants. The machine learning model is configured to generate offer recommendations for cardholders of payment cards. The offer recommendations are for merchant offers made available by merchants. The instructions also cause the computing device to apply available offer data to the machine learning model, thereby generating a set of offer recommendations matching one or more available offers with one or more cardholders. The instructions further cause the computing device to deliver an available offer to a cardholder. The instructions also cause the computing device to fulfill the available offer when activated by the cardholder.

BRIEF DESCRIPTION OF THE DRAWINGS

FIGS. 1-8 show example embodiments of the systems and methods described herein.

DETAILED DESCRIPTION

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems utilizing historical transaction data to develop and customize transaction criteria for identifying compromised merchants and cardholder accounts, and for identifying merchants and cardholder accounts that have a high risk for fraud before significant fraud actually occurs. In some example embodiments, the disclosed systems and methods may also prevent future fraudulent transactions.

Use of conventional neural network techniques such as conventional matrix factorization (MF) has been applied to recommender systems with some success, but MF suffers from choice of an interaction function, namely the inner product, which combines the multiplication of latent features linearly. New techniques, such as neural-network based collaborative filtering (or just "neural collaborative filtering") (NCF) and wide and deep (WAD) learning, have also been applied to recommender systems. Recommender systems play an important role in various online settings such as social media, e-commerce, online news, and online video.

The present disclosure provides a deep learning system, and associated devices and methods, that applies several deep learning techniques in the context of cardholder interactions with merchants via payment transactions and payment card transaction data. In an example embodiment, the deep learning system applies neural collaborative filtering with such data to generate a model that is configured to predict interactions between consumers and particular merchants. This NCF technique combines aspects of the techniques of generalized matrix factorization (GMF) with a multilayer perceptron (MLP) to generate a deep learning system that can provide improved predictions of offer activation for cardholders. During model build, the deep learning system focuses on a few pre-defined sliding features and custom overlap features (e.g., users identifying column names from data sources) such that efforts to pre-compute lifetime value (LTV) are reduced. The deep learning system generates exponential growth of hidden embedding features, effectively performing internal feature selections and optimization automatically (e.g., during cross validation at the training stage), thereby improving the ability to find optimal features and handle indirect relationships between features and goals.

As used herein, the terms "payment card," "transaction card," and "financial transaction card" refer to any suitable payment card, such as a credit card, a debit card, a prepaid card, a charge card, a membership card, a promotional card, a frequent flyer card, an identification card, a gift card, or any other device that may hold payment card information, such as mobile phones, Smartphones, personal digital assistants (PDAs), key fobs, or computers. Each type of transactions card can be used as a method of payment for performing a transaction.

As used herein, the term "cardholder" may refer to the owner or rightful possessor of a payment card. As used herein, the term "cardholder account" may refer specifically to a PAN or more generally to an account a cardholder has with the payment card issuer and that the PAN is or was associated with. As used herein, the term "merchant" may refer to a business, a charity, or any other such entity that can generate transactions with a cardholder account through a payment card network.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, "machine learning" refers to statistical techniques to give computer systems the ability to "learn" (e.g., progressively improve performance on a specific task) with data, without being explicitly programmed for that specific task. The terms "neural network" (NN) and "artificial neural network" (ANN), used interchangeably herein, refer to a type of machine learning in which a network of nodes and edges is constructed that can be used to predict a set of outputs given a set of inputs.

Figure 1:
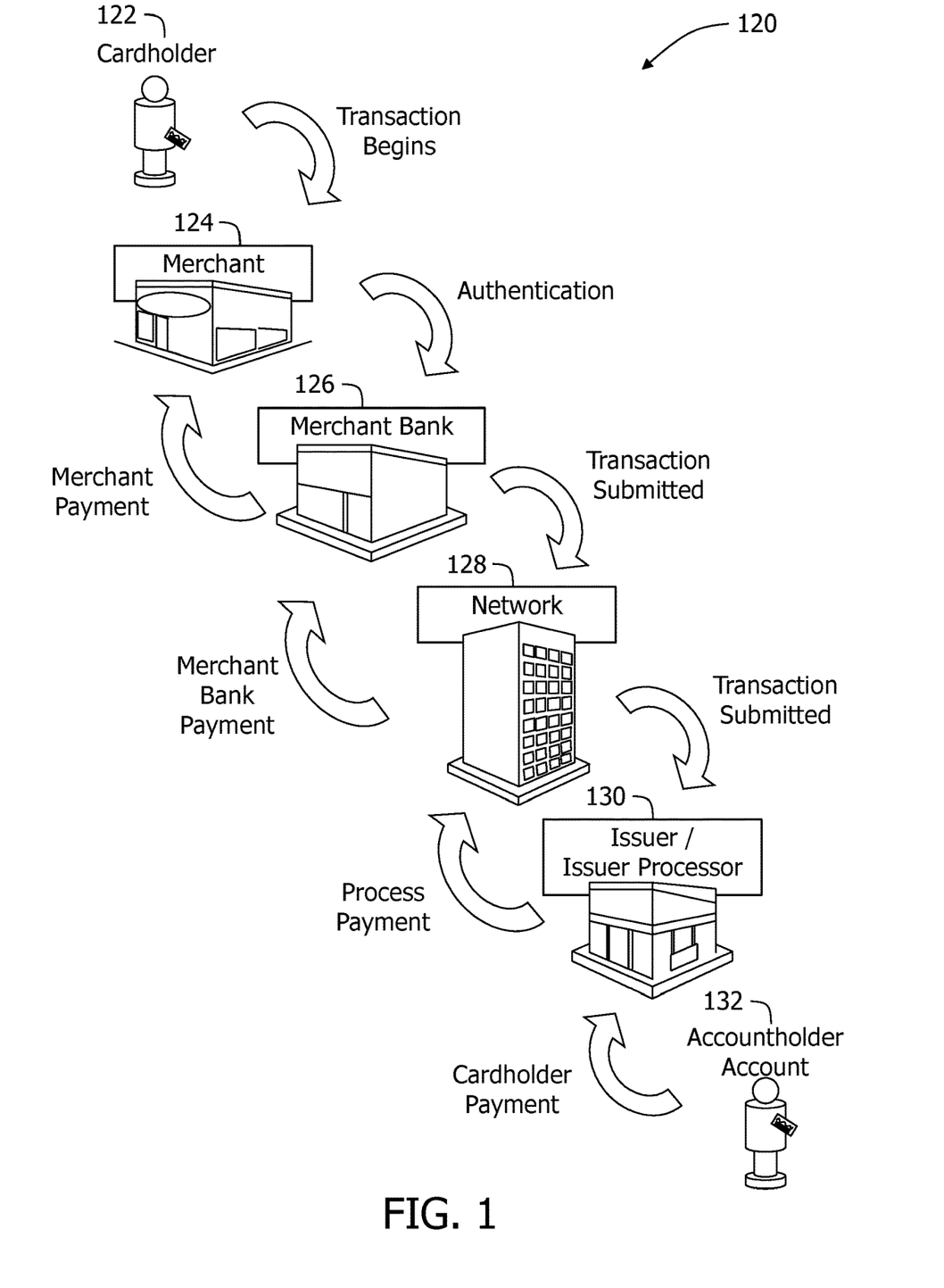
FIG. 1 is a schematic diagram illustrating an example multi-party payment processing system for enabling payment-by-card transactions.

FIG. 1 is a schematic diagram illustrating an example multi-party payment processing system 120 for enabling payment-by-card transactions. Embodiments described herein may relate to a payment card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

As described with respect to system 120, a financial institution called the "issuer" (or "issuer bank") 130 issues a payment card or electronic payments account identifier, such as a credit card, to a consumer or cardholder 122, who uses the payment card to tender payment for a purchase from a merchant 124. To accept payment with the payment card, merchant 124 must normally establish an account with a financial institution that is part of the financial payment system. This financial institution is usually called the "merchant bank," the "acquiring bank," or the "acquirer." When cardholder 122 tenders payment for a purchase with a payment card, merchant 124 requests authorization from a merchant bank 126 for the amount of the purchase. The request may be performed over the telephone or online or by an in-person merchant manually typing in the payment card information into a computer system, but the request is frequently performed through the use of a point-of-sale (POS) terminal, which reads cardholder's 122 payment card information from a magnetic stripe, a chip, or embossed characters on the payment card and communicates electronically with the transaction processing computers of merchant bank 126. Alternatively, merchant bank 126 may authorize a third party to perform transaction processing on its behalf. In this case, the POS terminal will be configured to communicate with the third party. Such a third party is usually called a "merchant processor," an "acquiring processor," or a "third party processor."

Using an interchange network 128 (e.g., a payment processor such as Mastercard®), computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because payment card associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the POS terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 or issuer bank 130 stores the payment card information, such as a category of merchant 124, a merchant identifier, a location where the transaction occurred, amount of purchase, date and time of transaction, in a database 216 (shown in FIG. 2).

After a purchase has been made, a clearing process occurs to transfer additional transaction data related to the purchase among the parties to the transaction, such as merchant bank 126, interchange network 128, and issuer bank 130. More specifically, during or after the clearing process, additional data, such as a time of purchase, a merchant name, a type of merchant, purchase information, cardholder account information, a type of transaction, itinerary information, information regarding the purchased item or service, or other suitable information, is associated with a transaction and transmitted between parties to the transaction as transaction data, and may be stored by any of the parties to the transaction. In the exemplary embodiment, when cardholder 122 purchases travel, such as airfare, a hotel stay, or a rental car, at least partial itinerary information is transmitted during the clearance process as transaction data. When interchange network 128 receives the itinerary information, interchange network 128 routes the itinerary information to database 216.

For debit card transactions, when a request for a personal identification number (PIN) authorization is approved by the issuer 130, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant bank 126, issuer bank 130, and an account merchant 124 related to the transaction. More specifically, a transaction is typically settled between issuer bank 130 and interchange network 128, and then between interchange network 128 and merchant bank 126, and then between merchant bank 126 and merchant 124. Usually, transactions are captured and accumulated into a "batch," which is settled as a group.

Figure 2:
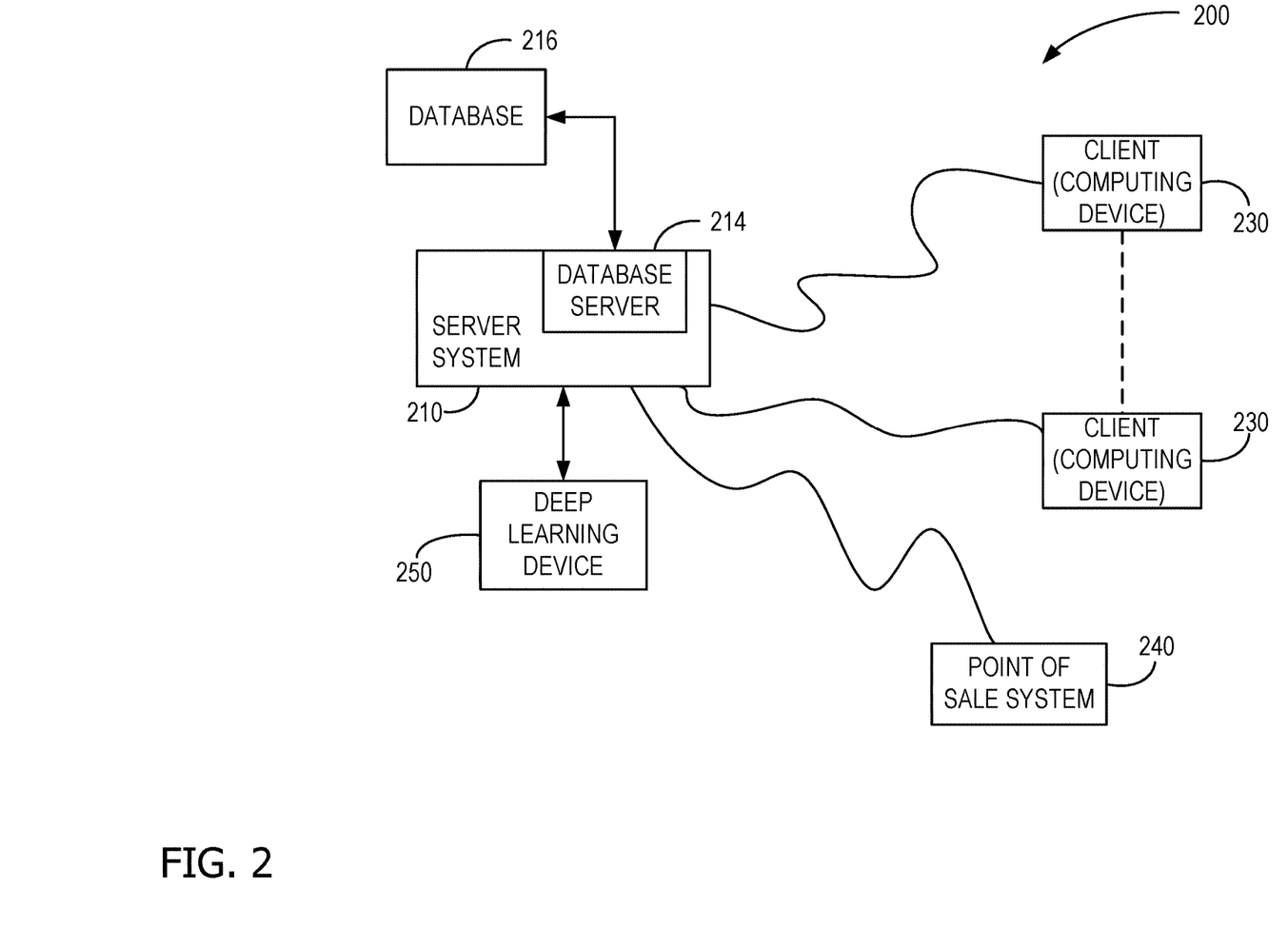
FIG. 2 is a simplified block diagram of an example deep learning system used for predicting consumer activation of prospective merchant off.

FIG. 2 is a simplified block diagram of an example deep learning system 200 used for predicting consumer activation of prospective merchant offers. System 200 may use cardholder and merchant information, as well as payment transaction information of payment-by-card transactions received as part of processing cardholder transactions in the payment processing system 120 shown in FIG. 1. In an example embodiment, deep learning system 200 is a payment processing system that includes a deep learning device 250 configured to generate predictions of consumer activation of merchant offers from such transaction information. Merchants 124 may wish to provide offers (e.g., discounts on products or services) to various consumers (e.g., cardholders 122). In the examples and use cases described herein, the deep learning system 200 operates as a type of recommender system, evaluating merchant offers for suitability to various cardholders by constructing and applying deep learning techniques using data available to the payment processing system. Merchants generally desire to extend offers to consumers that they will use, or "activate." The term "offer activation," as used herein, refers to an offer that was used, and where an offer typically includes a discount to goods or services being offered for sale by a merchant. In other words, when an offer is made (e.g., by a merchant and to a consumer), the offer is considered "activated" when the offer is used. The term "matched," as used herein, refers to an offer that is made but not necessarily activated. In other words, and for example, the results of a recommendation are user-offer matched pairs such that each individual is assigned 0 to n best matched offers (e.g., based on propensity model scoring), from which the user can choose to activate or not any or all of the matched offers. The deep learning system 200 is configured to evaluate the likelihood ("propensity") of particular cardholders 122 to activate offers from particular merchants 124 (e.g., personalized card-linked offers).

In the example embodiment, deep learning system 200 includes a server system 210 and multiple client systems 230. In some embodiments, client systems 230 include computers configured to implement a web browser or a software application, which enables client systems 230 to access server system 210 using the Internet. Client systems 230 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, client systems 230 include any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, client systems 230 may be computing devices associated with one of cardholder 122, merchant 124, bank 126, or issuer 130.

In one embodiment, server system 210 includes a database server 214 that is communicatively coupled to a database 216 for storing data. In an exemplary embodiment, database 216 stores transaction information from a plurality of cardholders, and may include offer information (e.g., offers previously made to cardholders, whether the offers were activated), user impression information (e.g., email, advertisements, web browsing, or other impression information presented to cardholders, whether those impressions were acted upon), and cardholder consumption information (e.g., past product or service purchase history with particular products or services, transacting with particular merchants). According to the exemplary embodiment, database 216 is disposed remotely from server system 210. In other embodiments, database 216 is decentralized, or may be a portion of server system 210. In the exemplary embodiment, a user (not shown) is able to access database 216 through client systems 230 by logging onto server system 210. In the example embodiment, server system 210 may be associated with interchange network 128.

Deep learning system 200 further includes one or more POS systems 240 that are communicatively coupled with the server system 210. POS systems 240 may be, for example, merchants 124 as shown in FIG. 1, and are communicatively coupled with server system 210 through payment network 120. POS systems 240 may include, without limitation, machines that accept card swipes, machines that accept chip card insertions, online payment portals, digital wallet payments, or stored payment card numbers for recurring transactions.

In the example embodiment, server system 210 is associated with a financial transaction interchange network, such as interchange network 128 shown in FIG. 1, and is also referred to as an interchange computer system. In some embodiments, server system 210 is used for processing transaction data. In one embodiment, at least one of client systems 230 includes a computer system associated with issuer 130 of a transaction payment card. Accordingly, server system 210 and client systems 230 may be used to process transaction data relating to purchases cardholder 122 makes using a payment card processed by the interchange network 128 and issued by the associated issuer 130. In the exemplary embodiment, at least one client system 230 may be associated with a user or cardholder 122 seeking to register, access information, or process a transaction with at least one of the interchange network, the issuer 130, or the merchant 124. In addition, client systems 230 or POS systems 240 may include individual POS devices (not shown) associated with merchant 124 and used for processing payment transactions. In an alternative embodiment, at least one client system 230 is utilized for investigating potential breaches.

In the example embodiment, deep learning device 250 is communicatively coupled with server system 210. Deep learning device 250 can access server system 210 to store and access data and to communicate with the client systems 230 through server system 210. In some embodiments, deep learning device 250 may be associated with or part of interchange network 128, or in communication with payment network 120, shown in FIG. 1. In other embodiments, deep learning device 250 is associated with a third party and is in electronic communication with the payment network 120. In some embodiments, deep learning device 250 may be associated with, or be part of merchant bank 126, interchange network 128, and issuer bank 130, all shown in FIG. 1.

Deep learning device 250, in the example embodiment, accesses historical payment transaction information of cardholder accounts 132 and merchants 124 from server system 210 and database 216. Payment transaction information (also referred to herein as "consumption information") may include products or services purchased by cardholders, dates of purchases, merchants associated with the purchases ("selling merchant"), category information (e.g., category, MCC code to which the transacting merchant belongs), geographic information (e.g., where the transaction occurred, location of the merchant or the POS device, country, state, city, zip code, longitude, latitude), channel information (e.g., which shopping channel the transaction used, online, in store, etc.), and so forth (e.g., for transactions occurring on the interchange network 128 between cardholders 122 and merchants 124). Deep learning device 250 also accesses offer information for various merchant offers. Offer information may include tentative offer information (e.g., offers under consideration for presentation to cardholders, before presentation), pending offer information (e.g., offers having been presented to cardholders, before activation), activated offer information (e.g., offers having been presented and consummated by cardholders), and stale offer information (e.g., offers having been presented, not activated by cardholders, now expired, inactive, or otherwise considered unused). Deep learning device 250 also accesses impression information for cardholders. Impression information includes information associated with online media ads, which generally represents a user (e.g., the cardholder 122) being presented with advertisement content (e.g., web ad, app ad, link, etc.), and may include activation information (e.g., whether the user clicked on, submitted a form, purchased a product, or otherwise acted upon the impression). In some embodiments, deep learning device 250 may access consumer identity information for cardholders or item information for merchants. Such information presents high dimensional sparse features that may be used as inputs of embedding.

In the example embodiment, the deep learning device 250 uses the transaction information, offer information, and impression information to train and apply deep learning techniques to evaluate tentative offers from merchants 124 (e.g., involving particular products or services) and the likelihood (propensity) particular cardholders 122 are to activate such offers. During configuration, deep learning device 250 performs a model training method to construct (e.g., train) a model (not shown in FIG. 2) using a body of training data constructed from aspects of the transaction information, offer information, and impression information. Once constructed, the deep learning device 250 uses the model to evaluate the propensity for particular cardholders (e.g., cardholders being considered as targets for the tentative offers) to activate offers from particular merchants. Using that output, the deep learning device 250 may, for example, identify a set of target cardholders to receive offers from a particular merchant. In some embodiments, the user-item propensity models may be exported to scoring, prediction, or recommendation services and integration points. Model servicing services may be integrated into business pipelines, such as embedding model use into offline systems, streaming jobs, or real-time dialogues (e.g., with Kafka messaging). For example, the user-item propensity model may be used to identify a set of target cardholders to receive offers from a particular category, identify a set of target cardholders to receive offers from a particular geography (e.g., zip code, city), identify a set of target cardholders who have similarity of source cardholders, or identify a set of target merchants or categories which the target cardholders may like in different locations (e.g., travelers).

Figure 3:
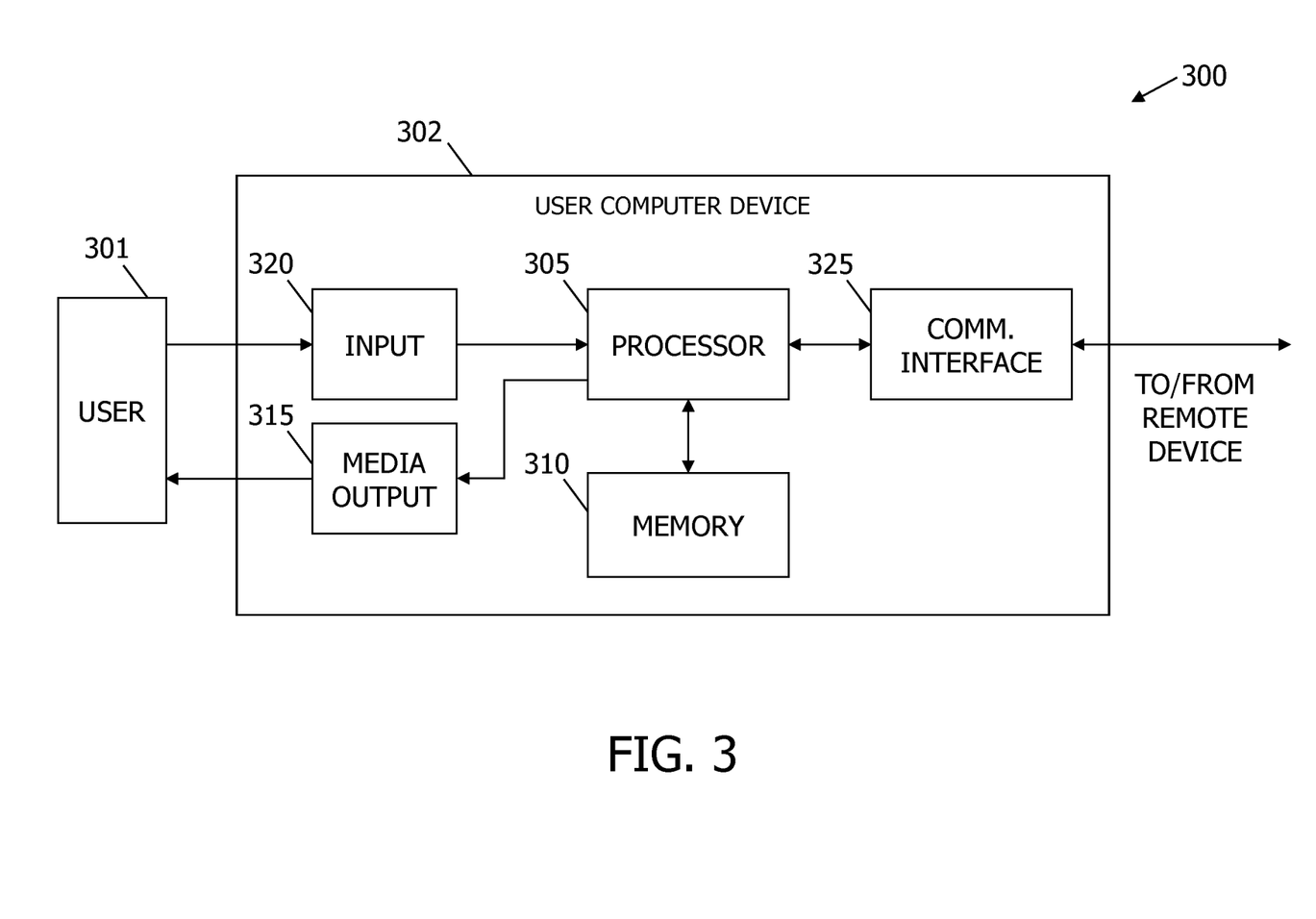
FIG. 3 illustrates an example configuration of a client system shown in FIG. 2, in accordance with one embodiment of the present disclosure.

FIG. 3 illustrates an example configuration of a client system 300 in accordance with one embodiment of the present disclosure. In the example embodiment, client system 300 includes at least one user computer device 302, operated by a user 301. User computer device 302 may be representative of client systems 230 or deep learning device 250 (both shown in FIG. 2). User computer device 302 includes a processor 305 for executing instructions, and a memory area 310. In some embodiments, executable instructions are stored in memory area 310. Processor 305 may, for example, include one or more processing units (e.g., in a multi-core configuration). Memory area 310 may, for example, be any device allowing information such as executable instructions or transaction data to be stored and retrieved. Memory area 310 may further include one or more computer readable media.

In the example embodiment, user computer device 302 further includes at least one media output component 315 for presenting information to user 301. Media output component 315 may, for example, be any component capable of converting and conveying electronic information to user 301. In some embodiments, media output component 315 includes an output adapter (not shown), such as a video adapter or an audio adapter, which is operatively coupled to processor 305 and operatively coupleable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 is configured to include and present a graphical user interface (not shown), such as a web browser or a client application, to user 301. The graphical user interface may include, for example, an online store interface for viewing or purchasing items, or a wallet application for managing payment information. In some embodiments, user computer device 302 includes an input device 320 for receiving input from user 301. User 301 may use input device 320, without limitation, to select or enter one or more items to purchase or request to purchase, to access credential information, or to access payment information. Input device 320 may include, for example, a keyboard, a pointing device, a mouse, a stylus, a touch sensitive panel (e.g., a touch pad or a touch screen), a gyroscope, an accelerometer, a position detector, a biometric input device, or an audio input device. A single component such as a touch screen may function as both an output device of media output component 315 and input device 320.

In one embodiment, user computer device 302 further includes a communication interface 325, communicatively coupled to a remote device such as server system 210 (shown in FIG. 2). Communication interface 325 may include, for example, a wired or wireless network adapter or a wireless data transceiver for use with a mobile telecommunications network.

In the example embodiment, memory area 310 stores computer readable instructions for providing a user interface to user 301 through media output component 315 and, optionally, for receiving and processing input from input device 320. A user interface may include, among other possibilities, a web browser or a client application. Web browsers enable users, such as user 301, to display and interact with media and other information typically embedded on a web page or a web site from server system 210. A client application allows user 301 to interact with, for example, server system 210. For example, instructions may be stored by a cloud service, and the output of the execution of the instructions sent to the media output component 315.

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 may be programmed with instructions such that it may execute the processes as illustrated in FIGS. 8, 9, and 10, below.

Figure 4:
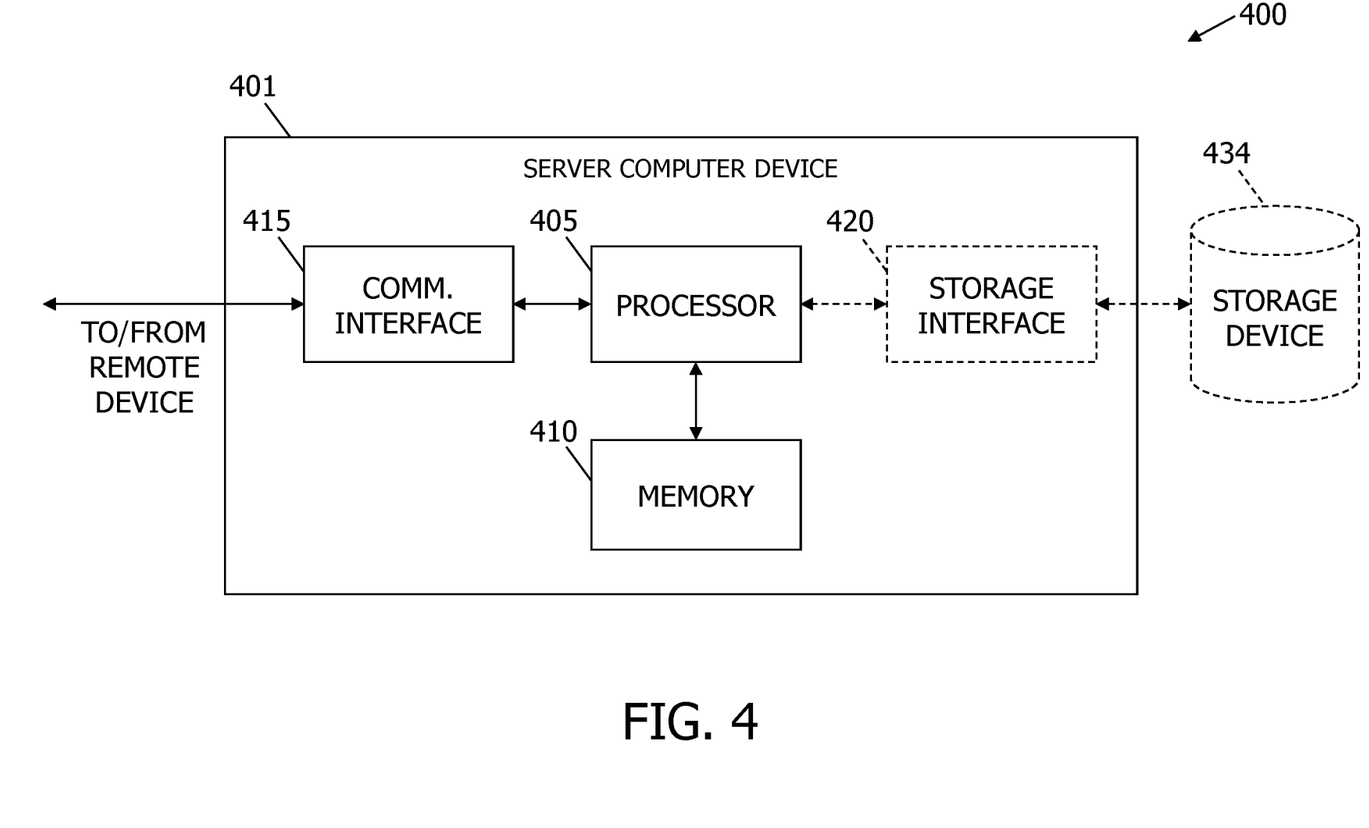
FIG. 4 illustrates an example configuration of the server system shown in FIG. 2, in accordance with an embodiment of the present disclosure.

FIG. 4 illustrates an example configuration of a server system 400, in accordance with an embodiment of the present disclosure. In the example embodiment, server system 400 includes at least one server computer device 401, in electronic communication with at least one storage device 434. Server computer device 401 may be representative of server system 210 and database server 214 (shown in FIG. 2). In the exemplary embodiment, server computer device 401 includes a processor 405 for executing instructions (not shown) stored in a memory 410. In an embodiment, processor 405 may include one or more processing units (e.g., in a multi-core configuration). The instructions may be executed within various different operating systems on the system 401, such as UNIX®, LINUX® (LINUX is a registered trademark of Linus Torvalds), Microsoft Windows®, etc. It should also be appreciated that upon initiation of a computer-based method, various instructions may be executed during initialization. Some operations may be required in order to perform one or more processes described herein, while other operations may be more general or specific to a particular programming language (e.g., C, C #, C++, Java, or other suitable programming languages, etc.).

In the example embodiment, processor 405 is operatively coupled to a communication interface 415 such that system 400 is capable of communicating with a remote device such as a user system or another system 400. For example, communication interface 415 may receive requests from client system 300 (FIG. 3) via the Internet, within the scope of the embodiment illustrated in FIG. 4.

In the example embodiment, processor 405 is also operatively coupled to a storage device 434, which may be, for example, a computer-operated hardware unit suitable for storing or retrieving data. In some embodiments, storage device 434 is integrated in system 400. For example, system 400 may include one or more hard disk drives as storage device 434. In other embodiments, storage device 434 is external to system 400 and may be accessed by a plurality of systems 400. For example, storage device 434 may include multiple storage units such as hard disks or solid state disks in a redundant array of inexpensive disks (RAID) configuration. Storage device 434 may include a storage area network (SAN) or a network attached storage (NAS) system.

In some embodiments, processor 405 is operatively coupled to storage device 434 via an optional storage interface 420. Storage interface 420 may include, for example, a component capable of providing processor 405 with access to storage device 434. In an exemplary embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, or a similarly capable component providing processor 405 with access to storage device 434.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

Figure 5:
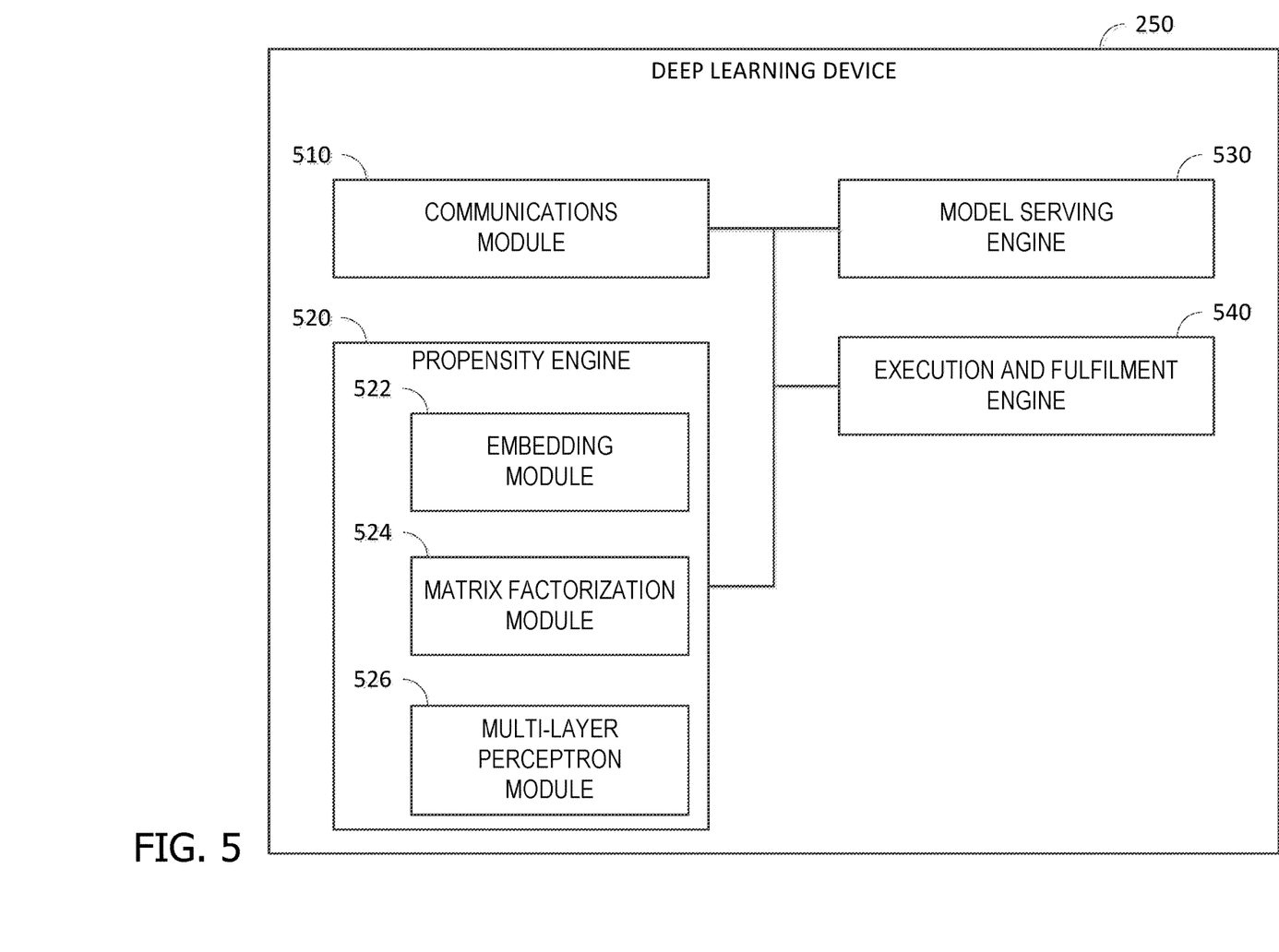
FIG. 5 is a component diagram of the deep learning device in one example embodiment.

FIG. 5 is a component diagram of the deep learning device 250 in one example embodiment. In the example embodiment, the deep learning device 250 includes communications module 510, a propensity engine 520, a model serving engine 530, and an execution and fulfilment engine 540 which, together, perform various aspects of the recommendation methods described herein. More specifically, the communications module 510 is configured to perform various communication functionality between the deep learning device 250 and other computing devices, such as the server system 210 and other computing devices of the payment processing system 120. For example, the communications module 510 may be configured to receive input data (e.g., from database server 214) for the various inputs used to create the models described herein, or to transmit recommendation results of applications of those models (e.g., to client computing devices 230, server system 210).

Propensity engine 520 is configured to train deep learning models, using various input data, which can generate offer recommendations. In the example embodiment, the propensity engine 520 includes an embedding module 522, a matrix factorization module 524, and a multi-layer perceptron module 526 that, together, implement neural collaborative filtering techniques as described herein. The embedding module 522 performs aspects of data input acquisition, preparation, and staging (e.g., feature preparation). The matrix factorization module 524 performs the matrix factorization steps of model building associated with NCF and the multi-layer perceptron module 526 performs the multi-layer perceptron steps of model building associated with NCF. Additional detail associated with application of NCF is provided below with respect to FIG. 6.

Model serving engine 530 applies the models built by the propensity engine 520 to generate various offer recommendations for cardholders (e.g., using aspects of cardholder data as inputs to the model). The model serving engine may use inputs such as offer limits and objectives for offer campaigns, business rules and constraints, and customer preference data. In the example embodiment, model serving engine 530 is illustrated as a part of deep learning device 250. In other embodiments, the models built by the propensity engine 520 may be deployed to or otherwise accessible from other computing devices in the payment processing system 120, such as server system 210. Execution and fulfilment engine 540 presents the offer recommendations to cardholders through various venues, as well as captures offer activation data for those offers (e.g., which offers were acted upon by the offeree cardholder, how the offeree cardholder acted upon the offer, and so forth). Aspects of operation of model serving engine 530 and execution and fulfilment engine 540 are discussed in greater detail below with respect to FIGS. 7 and 8.

Figure 6:
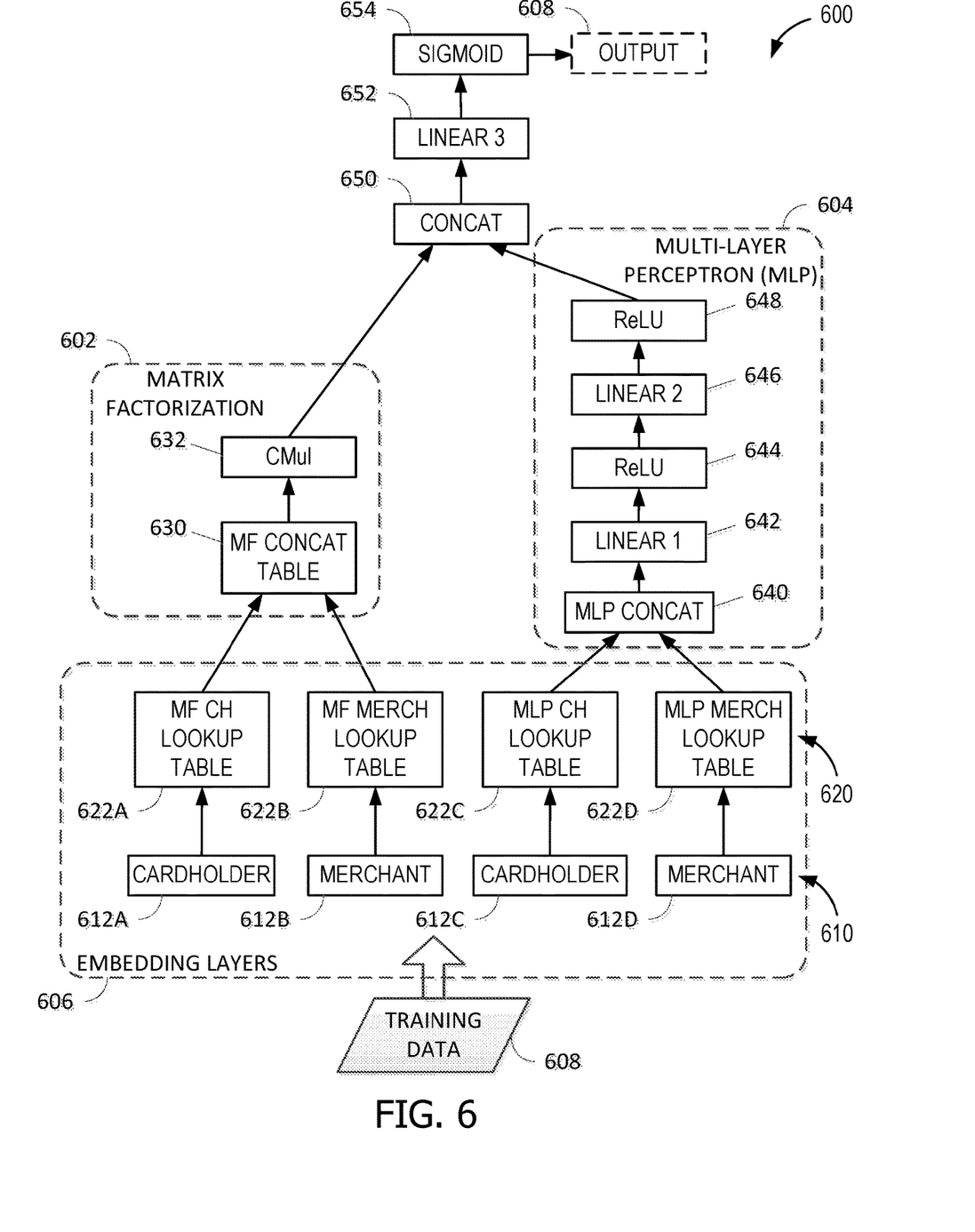
FIG. 6 is a flow chart illustrating various operating components of a neural recommender model trained and implemented by the deep learning device in the deep learning system.

FIG. 6 is a diagram illustrating various operating components of a neural recommender model 600 trained and implemented by the deep learning device 250 in the deep learning system 200. In the example embodiment, the neural recommender model 600 implements neural collaborative filtering and is configured to evaluate cardholder propensity to activate offers from particular merchants, or various other dimensions. The neural recommender model 600 is a multi-layer representation that models user-item (e.g., cardholder-merchant) interactions, where the output of one layer is used as the input of the next layer (e.g., in an upward flow, as shown in FIG. 6). The neural recommender model 600 includes embedding layers 606 where training data 608 is staged for use by both matrix factorization (MF) 602 and a multi-layer perceptron (MLP) 604. Once trained, the neural recommender model 600 generates propensities for cardholders 122 to activate offers from particular items (e.g., merchant, category, channel, geography, etc.). In some examples provided herein, merchant is treated as the "item" dimension.

In the example embodiment, during training and configuration of the neural recommender model 600, the neural recommender model 600 begins in an unconfigured state with generating an input layer 610 from training data 608 (e.g., transaction information, offer information, and impression information). More specifically, the deep learning device 250 creates input components 612 of the input layer 610 from the training data 608 (separately illustrated as cardholder data 612A, 612C and merchant data 612B, 612D. A sample typically consists of three parts: label, feature, and a sample ID. The sample ID is the identifier of a particular sample. The training process is the process of learning the label through the feature. The label can be a single value (e.g., two classification) or multiple values (e.g., multi-classification). Each sample can be represented in the form of a vector (e.g., image features, gender information of the cardholder, and so forth). Traditional features are typically dense, and the dimensions are not particularly high. In the example embodiment, there are a large number of sparse features associated with cardholder and payment card network data. These feature dimensions are high (e.g., tens of millions), but the number of occurrences in each sample is low (e.g., hundreds), and such features are sparsely represented in multiple key-value ways (e.g., merchant category (where key is the ID of the category and with no value), list of merchants that the user visited (where key is the merchant ID and value is the number of visits). Features are organized in the form of feature groups to facilitate the construction of training networks. For example, features may be: category (dense features), user identity (sparse features), merchant (sparse features), spend amount (dense features).

In the example embodiment, the deep learning device 250 constructs an embedding layer 620 from the input layer 610. More specifically, the embedding layer 620 includes two lookup tables 622A, 622B to be used for matrix factorization 602 and two lookup tables 622C, 622D to be used for the multi-layer perceptron 604. The deep learning device 250 constructs lookup tables 622A, 622C for cardholder information from the cardholder input components 612A, 612C, respectively, as well as two lookup tables 622B, 622D for merchant information from for the merchant input components 612B, 612D, respectively. In some embodiments, the lookup tables 622 are the output of the encoding/indexing process. The deep learning device 250 builds StringIndexModel for users and items via the Spark API spark-mllib-StringIndexer (as provided by Apache Spark). After the StringIndex model is generated, they will be mapped to the LookupTable structure (e.g., from Intel BigDL):

```
object LookupTable {
    def apply[@specialized(Float, Double)T: ClassTag](
        nIndex: Int, nOutput: Int,
        paddingValue: Double = 0, maxNorm: Double = Double.MaxValue,
        normType: Double = 2.0, shouldScaleGradByFreq: Boolean = false,
        wRegularizer: Regularizer[T] = null,
        maskZero: Boolean = false
    )
    (implicit ev: TensorNumeric[T]): LookupTable[T] =
        new LookupTable[T](nIndex, nOutput, paddingValue,
        maxNorm, normType, shouldScaleGradByFreq, wRegularizer, maskZero)
}
```

The deep learning device 250 uses two methods of neural collaborative filtering, namely matrix factorization 602 in conjunction with multi-layer perceptron 604. MF 602 and MLP 604, in the example embodiment, learn separate embeddings in the embedding layers 606, but combine the two models in their last hidden layer. More specifically, the deep learning device 250 uses the cardholder lookup table 622A and merchant lookup table 622B for matrix factorization 602, and uses the cardholder lookup table 622C and merchant lookup table 622D for the multi-layer perceptron 604. For MF 602, the two lookup tables 622A, 622B are concatenated into an MF concatenated table 630. MF 602 uses one hidden layer, CMul 32, in matrix factorization processing. For example:

```
def getBigDLModel(
    ulimit: Int, uOutput: Int,
    mlimit: Int, mOuput: Int,
    params: AppParams,
    featureDimension: Int): Module[Float] = {
    val initialWeight = 0.5
    // construct LookupTable for user
    val user_table = LookupTable(ulimit, uOutput)
    // construct LookupTable for item
    val item_table = LookupTable(mlimit, mOuput)
    // set weights parameter ( random way) to all the LookupTable
    user_table.setWeightsBias(Array(Tensor[Float](ulimit,uOutput).randn(0,
        initialWeight)))
    item_table.setWeightsBias(Array(Tensor[Float](mlimit,mOuput).randn(0,
        initialWeight)))
    // how many extra dense features
    val numExtraFeature = featureDimension - 2
    // contact MF features together to be CMul hidden layer
    val embedded_layer = if (numExtraFeature > 0) {
        Concat(2)
            .add(Sequential( ).add(Select(2, 1)).add(user_table))
            .add(Sequential( ).add(Select(2, 2)).add(item_table))
            .add(Sequential( ).add(Narrow(2, 3, numExtraFeature)))
    } else {
        Concat(2)
            .add(Sequential( ).add(Select(2, 1)).add(user_table))
            .add(Sequential( ).add(Select(2, 2)).add(item_table))
    }
    // use Sequentical model structure
    val model = Sequential( )
    // add CMul layer to model
    model.add(embedded_layer)
    // construct MLP hidden layers
    val numEmbeddingOutput = uOutput + mOuput + numExtraFeature
    val linear1 = math.pow(2.0, (math.log(numEmbeddingOutput) /
        math.log(2)).toInt).toInt
    val linear2 = linear1 / 2
    model.add(Linear(numEmbeddingOutput,
        linear1)).add(ReLU( )).add(Dropout( ))
    model.add(Linear(linear1, linear2)).add(ReLU( ))
    // Concate the CMul and MLP hidden layers and adopt logSoftMax
    activation functions to predict final output layer
    model.add(Linear(linear2, 2)).add(LogSoftMax( ))
    if (params.debug) {
        println(model)
    }
    model
}
```

For MLP 604, the deep learning device 250, in the example embodiment, the two lookup tables 622C, 622D are concatenated into an MLP concatenated table 640. MLP 604 uses two hidden layers, "Linear 1" 642 and "Linear 2" 646, for the multi-layer perceptron processing, along with subsequent actifiers ReLU 642, 648 (rectified linear unit). In the example embodiment, MF 602 and MLP 604 have, share "Linear 3" 652 as their last hidden layer.

Figure 7:
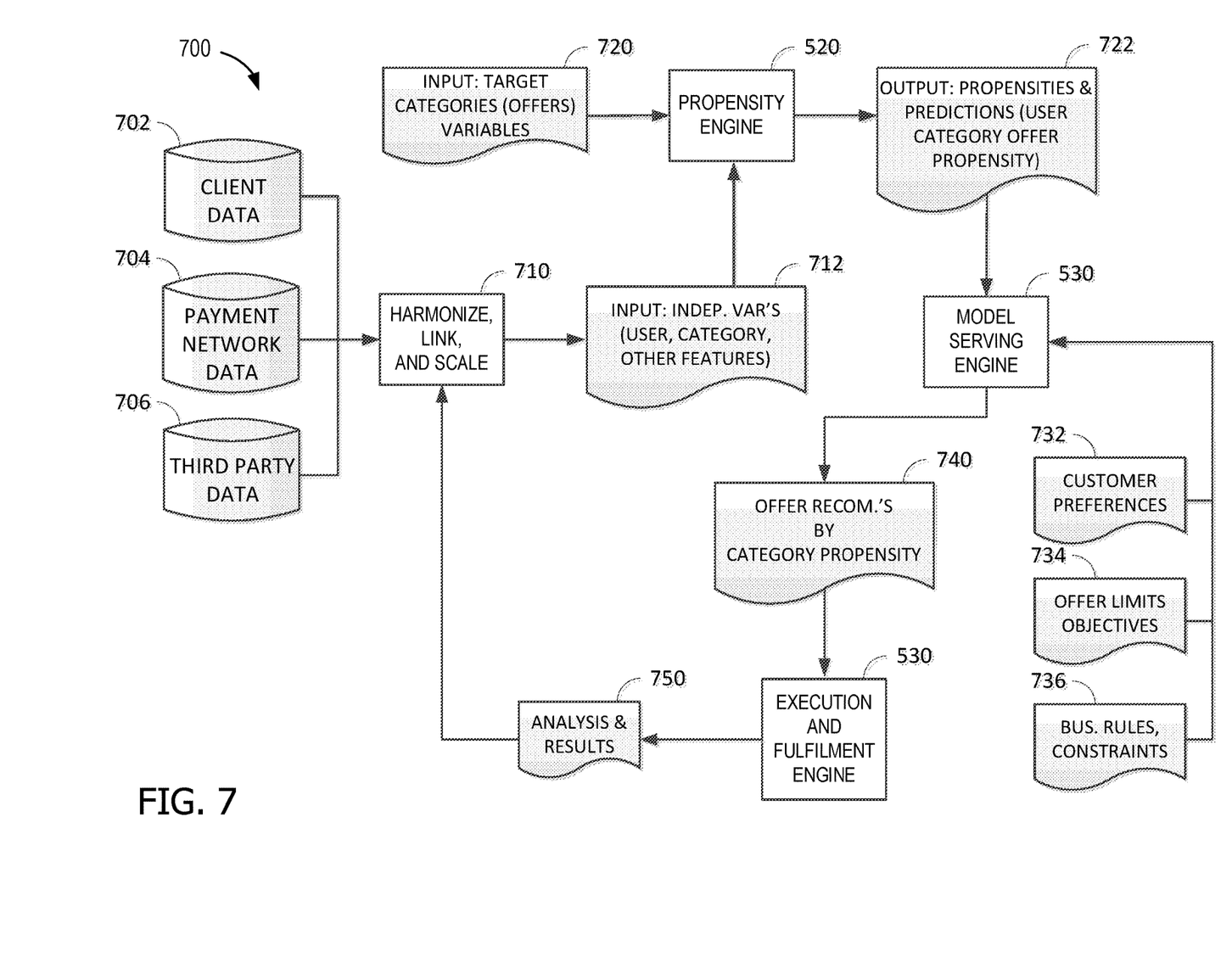
FIG. 7 is a data flow diagram illustrating a process and associated data for identifying target cardholders to receive offers from a particular category.

FIG. 7 is a data flow diagram illustrating a process 700 and associated data for identifying target cardholders to receive offers from a particular category. In the example embodiment, the process 700 is performed by the various components of the deep learning device 250 with data from the payment processing system 120 using the NCF techniques described above. The deep learning device 250 uses client data 702, payment network data 704, and third party data 706 as inputs to harmonize, link, and scale 710 the inputs into independent variables 712 (e.g., user, category, and other features). Inputs 712 are used in model training by propensity engine 520, along with input 720 of target categories (offers) variables. The propensity engine 520 uses the NCF techniques described above with respect to FIG. 6 to generate propensities and predictions (e.g., user category offer propensity) model 722.

The model serving engine 530, in the example embodiment, uses the model 722, along with inputs of customer preferences 732, offer limits and objectives 734, and business rules and constraints 736, to generate offer recommendations by category propensity 740. The execution and fulfilment engine 530 acts on the offer recommendations 740 by presenting selecting and presenting offers to cardholders based on the offer recommendations 740. Analysis and results 750 may be generated and provided back into the process 700 (e.g., to inform subsequent model generation).

Figure 8:
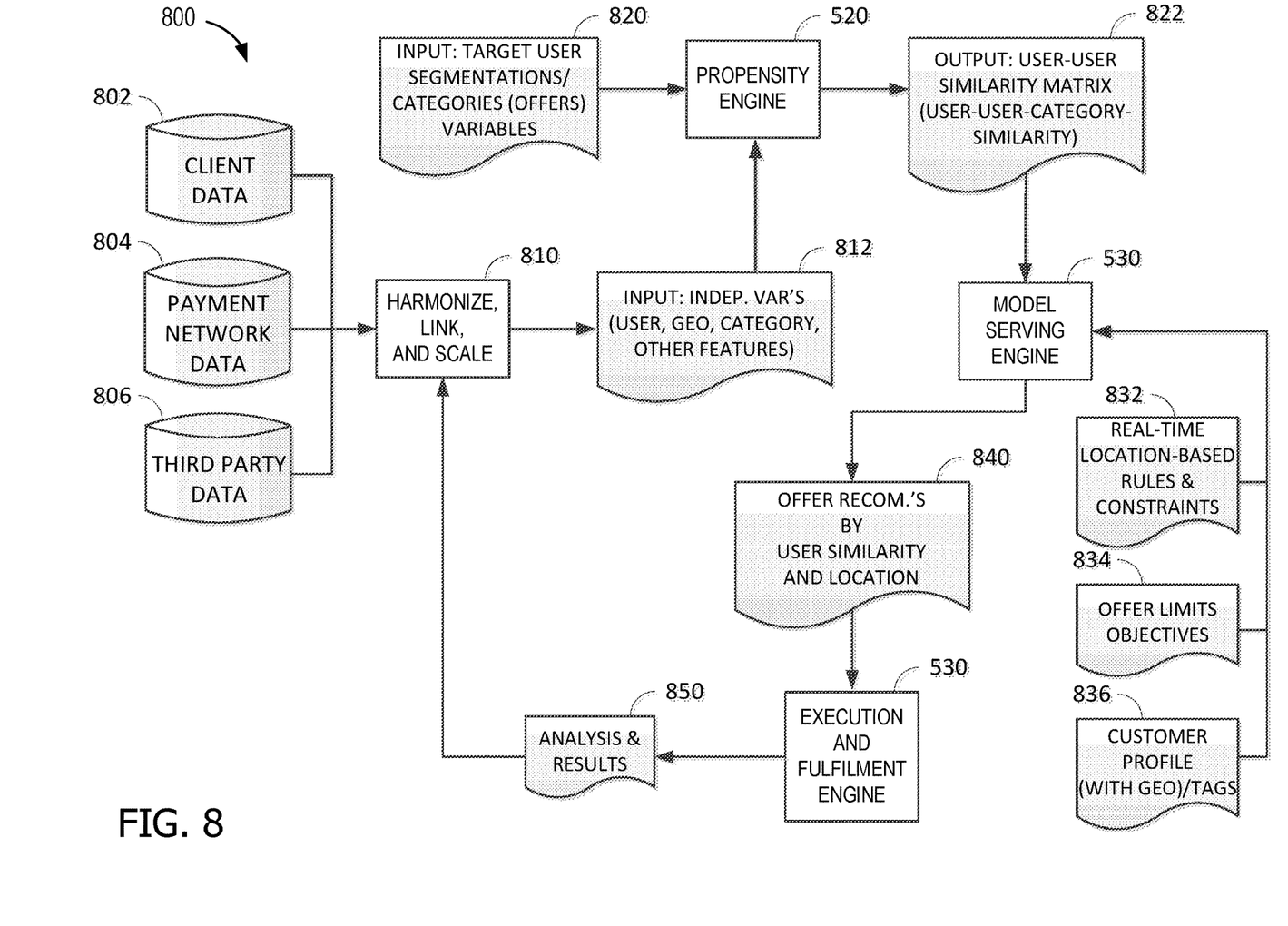
FIG. 8 is a data flow diagram illustrating a process and associated data for identifying merchants or categories which a cardholder may like when in a different location (e.g., while traveling).

FIG. 8 is a data flow diagram illustrating a process 800 and associated data for identifying merchants or categories which a cardholder may like when in a different location (e.g., while traveling). In the example embodiment, the process 800 is performed by the various components of the deep learning device 250 with data from the payment processing system 120 using the NCF techniques described above. The deep learning device 250 uses client data 802, payment network data 804, and third party data 806 as inputs to harmonize, link, and scale 810 the inputs into independent variables 812 (e.g., user, geography, category, and other features). Inputs 812 are used in model training by propensity engine 520, along with input 820 of target user segmentations/categories (offers) variables. The propensity engine 520 uses the NCF techniques described above with respect to FIG. 6 to generate user-user similarity matrix 822 (e.g., user user category similarity).

The model serving engine 530, in the example embodiment, uses the matrix 822, along with inputs of real-time location-based rules and constraints 832, offer limits and objectives 834, and customer profile (with geolocation data) 836, to generate offer recommendations by user similarity and location 840. The execution and fulfilment engine 530 acts on the offer recommendations 840 by presenting selecting and presenting offers to cardholders based on the offer recommendations 840. Analysis and results 850 may be generated and provided back into the process 800 (e.g., to inform subsequent model generation).

Example embodiments of systems and methods for evaluating offer suitability between cardholders and merchants are described above in detail. Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

For example, the methods may also be used in combination with other account systems and methods, and are not limited to practice with only the transaction card account systems and methods as described herein. Rather, the example embodiment can be implemented and utilized in connection with many other data storage and analysis applications. While the disclosure has been described in terms of various specific embodiments, those skilled in the art will recognize that particular elements of one drawing in the disclosure can be practiced with elements of other drawings herein, or with modification thereto, and without departing from the spirit or scope of the claims.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), or any transmitting/receiving medium such as the Internet or other communication network or link. The article of manufacture containing the computer code may be made or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural or object-oriented programming language, or in assembly/machine language. As used herein, the terms "machine-readable medium" and "computer-readable medium" refer to any computer program product, apparatus or device (e.g., magnetic discs, optical disks, memory, Programmable Logic Devices (PLDs)) used to provide machine instructions or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions or data to a programmable processor.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for training and applying deep learning to generate offer recommendations within a payment card network, the system comprising:
    a propensity engine configured to train a machine learning model using neural collaborative filtering that predicts cardholder propensity to activate offers from particular merchants, the propensity engine is configured to train the machine learning model using historical payment card transaction data that provides indications of cardholder interactions with merchants, the machine learning model is configured to identify cardholders of payment cards as candidates for offer recommendations, the offer recommendations are for merchant offers made available by merchants, the machine learning model combines outputs from matrix factorization and a multi-layer perceptron using a cardholder lookup table and a merchant lookup table during model training, the matrix factorization defines cardholder-merchant interactions layer, the multi-layer perceptron defines one or more hidden layers of an artificial neural network that are combined with output of the matrix factorization;
    a model serving engine configured to apply a merchant offer to the machine learning model, thereby generating offer recommendations identifying one or more cardholders based on their likelihood to activate the merchant offer; and
    an execution and fulfilment engine configured to deliver an available offer to a cardholder and fulfill the available offer when activated by the cardholder.

2. The system of claim 1, wherein the machine learning model is configured to generate offer recommendations based on cardholder category offer propensity.

3. The system of claim 2, wherein the propensity engine is further configured to train the machine learning model based on payment card transaction data of cardholders and target categories.

4. The system of claim 1, wherein the machine learning model is configured to generate offer recommendations based on cardholder-cardholder similarity.

5. The system of claim 4, wherein the machine learning model is a cardholder-cardholder similarity matrix.

6. The system of claim 4, wherein the propensity engine is further configured to train the machine learning model based on payment card transaction data of cardholders, cardholder geographic location, and target user segmentations.

7. A computer-implemented method for training and applying deep learning to generate offer recommendations within a payment card network, the method implemented using a processor in communication with a memory, the method comprising:
    training a machine learning model using neural collaborative filtering that predicts cardholder propensity to activate offers from particular merchants, the propensity engine is configured to train the machine learning model using historical payment card transaction data that provides indications of cardholder interactions with merchants, the machine learning model is configured to identify cardholders of payment cards as the candidates for offer recommendations, the offer recommendations are for merchant offers made available by merchants, the machine learning model combines outputs from matrix factorization and a multi-layer perceptron using a cardholder lookup table and a merchant lookup table during model training, the matrix factorization defines cardholder-merchant interactions layer, the multi-layer perceptron defines one or more hidden layers of an artificial neural network that are combined with output of the matrix factorization;
    applying a merchant offer to the machine learning model, thereby generating offer recommendations identifying one or more cardholders based on their likelihood to activate the merchant offer;
    delivering an available offer to a cardholder; and
    fulfilling the available offer upon cardholder activation.

8. The method of claim 7, wherein the machine learning model is configured to generate offer recommendations based on cardholder category offer propensity.

9. The method of claim 8, wherein training the machine learning model further includes training the machine learning model based on payment card transaction data of cardholders and target categories.

10. The method of claim 7, wherein the machine learning model is configured to generate offer recommendations based on cardholder-cardholder similarity.

11. The method of claim 10, wherein the machine learning model is a cardholder-cardholder similarity matrix.

12. The method of claim 10, wherein training the machine learning model further includes training the machine learning model based on payment card transaction data of cardholders, cardholder geographic location, and target user segmentations.

13. A non-transitory computer readable medium that includes computer executable instructions wherein, when executed by a computing device comprising at least one processor in communication with at least one memory device, the computer executable instructions cause the computing device to:
- train a machine learning model using neural collaborative filtering that predicts cardholder propensity to activate offers from particular merchants, the propensity engine is configured to train the machine learning model using historical payment card transaction data that provides indications of cardholder interactions with merchants, the machine learning model is configured to identify cardholders of payment cards as candidates for offer recommendations, the offer recommendations are for merchant offers made available by merchants, the machine learning model combines outputs from matrix factorization and a multi-layer perceptron using a cardholder lookup table and a merchant lookup table during model training, the matrix factorization defines cardholder-merchant interactions layer, the multi-layer perceptron defines one or more hidden layers of an artificial neural network that are combined with output of the matrix factorization;
- apply a merchant offer to the machine learning model, thereby generating offer recommendations identifying one or more cardholders based on their likelihood to activate the merchant offer;
- deliver an available offer to a cardholder; and
- fulfill the available offer when activated by the cardholder.

14. The non-transitory computer readable medium of claim 13, wherein the machine learning model is configured to generate offer recommendations based on cardholder category offer propensity.

15. The non-transitory computer readable medium of claim 14, wherein training the machine learning model further includes training the machine learning model based on payment card transaction data of cardholders and target categories.

16. The non-transitory computer readable medium of claim 13, wherein the machine learning model is configured to generate offer recommendations based on cardholder-cardholder similarity.

17. The non-transitory computer readable medium of claim 16, wherein the machine learning model is a cardholder-cardholder similarity matrix.

18. The non-transitory computer readable medium of claim 16, wherein training the machine learning model further includes training the machine learning model based on payment card transaction data of cardholders, cardholder geographic location, and target user segmentations.

* * * * *